(12) United States Patent
Meister et al.

(10) Patent No.: US 11,186,291 B2
(45) Date of Patent: Nov. 30, 2021

(54) METHOD FOR OPERATING A BRAKE SYSTEM OF A MOTOR VEHICLE, AND CONTROL DEVICE AND BRAKE SYSTEM

(71) Applicant: Robert Bosch GmbH, Stuttgart (DE)

(72) Inventors: Christian Meister, Sachsenheim (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 16/444,028

(22) Filed: Jun. 18, 2019

(65) Prior Publication Data

US 2019/0389480 A1 Dec. 26, 2019

(30) Foreign Application Priority Data

Jun. 20, 2018 (DE) ...................... 10 2018 210 021.7

(51) Int. Cl.
*G06G 7/00* (2006.01)
*B60W 50/029* (2012.01)
*B60W 10/188* (2012.01)
*B60T 13/74* (2006.01)
*B60W 30/18* (2012.01)
(Continued)

(52) U.S. Cl.
CPC ........... *B60W 50/029* (2013.01); *B60T 7/107* (2013.01); *B60T 13/748* (2013.01);
(Continued)

(58) Field of Classification Search
CPC ...... B60T 13/748; B60T 7/107; B60T 13/662; B60T 13/741; B60T 7/042; B60T 13/745; B60T 17/22; B60T 7/108; B60T 13/746; B60W 10/188; B60W 10/192; B60W 2050/022; B60W 30/18109; B60W 50/029; B60W 2050/0297; B60W 2050/029; B60W 2050/0295; B60W 10/198; B60W 10/182; B60W 10/184; B60W 30/18127;
(Continued)

(56) References Cited

U.S. PATENT DOCUMENTS

2004/0026989 A1* 2/2004 Suzuki .................. B60T 13/741
303/89
2006/0163939 A1* 7/2006 Kuramochi ........... B60T 13/741
303/122.04
(Continued)

FOREIGN PATENT DOCUMENTS

DE 10 2004 004 992 A1 9/2005
DE 10 2007 022 510 A1 11/2008

*Primary Examiner* — B M M Hannan
(74) *Attorney, Agent, or Firm* — Maginot, Moore & Beck LLP

(57) ABSTRACT

A method for operating a brake system of a motor vehicle includes actuating a first actuating device of the brake system, exerting an electromechanical braking force to decelerate the motor vehicle in an event of a fault in the hydraulic braking device and when the first actuating device is actuated, and generating the electromechanical braking force after a start of the actuation of the first actuating device for a minimum generation period and/or generating the electromechanical braking force after an end of the actuation of the first actuating device for an additional continued generation period. The brake system includes a hydraulic braking device, an electromechanical braking device, and a first actuating device, in particular a brake pedal.

14 Claims, 4 Drawing Sheets

(51) Int. Cl.
  *B60T 7/10* (2006.01)
  *B60W 10/192* (2012.01)
  *B60W 50/02* (2012.01)
(52) U.S. Cl.
  CPC ........ *B60W 10/188* (2013.01); *B60W 10/192* (2013.01); *B60W 30/18109* (2013.01); *B60W 2050/022* (2013.01); *B60W 2050/0297* (2013.01)
(58) Field of Classification Search
  CPC ......... B60W 30/18136; B60W 30/181; B60W 50/0225; F16D 2121/04; F16D 2121/24; F16D 55/226; F16D 65/183
  USPC .................................. 701/48, 70–71, 78, 83
  See application file for complete search history.

(56) References Cited

U.S. PATENT DOCUMENTS

| | | | |
|---|---|---|---|
| 2008/0135357 A1* | 6/2008 | Lang | B60T 13/74 188/158 |
| 2011/0017554 A1* | 1/2011 | Baehrle-Miller | B60T 8/32 188/72.1 |
| 2013/0001027 A1* | 1/2013 | Baehrle-Miller | F16D 65/18 188/106 F |
| 2013/0138316 A1* | 5/2013 | Koyama | B60T 13/66 701/70 |
| 2013/0181506 A1* | 7/2013 | Weiberle | B60T 7/06 303/3 |
| 2013/0333988 A1* | 12/2013 | Bieltz | B60T 7/107 188/152 |
| 2015/0041257 A1* | 2/2015 | Baehrle-Miller | B60T 13/74 188/1.11 E |
| 2015/0061365 A1* | 3/2015 | Sakashita | B60T 11/103 303/15 |
| 2015/0197224 A1* | 7/2015 | Hesseler | B60T 8/17 701/70 |
| 2015/0217750 A1* | 8/2015 | Sussek | B60T 17/221 701/70 |
| 2017/0174189 A1* | 6/2017 | Richards | G05G 1/38 |
| 2017/0341633 A1* | 11/2017 | Blattert | B60T 8/96 |
| 2018/0244255 A1* | 8/2018 | Kawai | B60T 8/885 |
| 2020/0039488 A1* | 2/2020 | Rebholz-Goldmann | B60T 13/746 |
| 2020/0324751 A1* | 10/2020 | Englert | B60T 13/741 |

\* cited by examiner

METHOD FOR OPERATING A BRAKE SYSTEM OF A MOTOR VEHICLE, AND CONTROL DEVICE AND BRAKE SYSTEM

This application claims priority under 35 U.S.C. § 119 to patent application no. DE 10 2018 210 021.7, filed on Jun. 20, 2018 in Germany, the disclosure of which is incorporated herein by reference in its entirety.

BACKGROUND

The disclosure relates to a method for operating a brake system of a motor vehicle and to a control device and to a brake system.

DE 10 2004 004 992 A1 discloses a brake system comprising a handbrake system having an electric brake motor, by means of which, to generate a clamping force fixing the motor vehicle in a stationary position, a brake piston can be displaced against a brake disk. The handbrake system can be integrated in the hydraulic motor vehicle brake. In regular brake operation, the brake piston is pressed against the brake disk by a hydraulic brake fluid.

DE 10 2007 022 510 A1 further discloses a brake system comprising a hydraulic two-circuit vehicle brake. The brake system is additionally equipped with an electromechanical braking device which is used as a handbrake and has an electric motor on a brake caliper of the brake system. By means of actuation by the driver, to carry out emergency braking, the electric brake motor can be activated, and an electromechanical braking force can be generated electromechanically.

SUMMARY

The problem addressed by the disclosure is solved by a method for operating a brake system of a motor vehicle, and by a control device and a brake system. Advantageous developments are indicated in the dependent claims. Features which are important for the disclosure are further found in the following description and in the drawings, wherein the features can be important for the disclosure both in isolation and in different combinations without reference being explicitly made hereto again.

A method for operating a brake system of a motor vehicle, comprising a hydraulic braking device, an electromechanical braking device, and a first actuating device which can be actuated manually by a user or automatically by an autonomous drive control, in particular a brake pedal, is thus firstly proposed. In the event of a fault in the hydraulic braking device, when the first actuating device is actuated by means of the electromechanical braking device, an electromechanical braking force is exerted to decelerate the motor vehicle. In this case, the electromechanical braking force is generated after the start of the actuation of the first actuating device for a minimum generation period. Additionally or alternatively, the electromechanical braking force is generated after the end of the actuation of the first actuating device for an additional continued generation period.

In the event of a fault in the hydraulic braking device, an emergency deceleration can consequently be achieved by generating an electromechanical braking force by means of the electromechanical braking device. A fault can be for example a partial failure or a complete failure of the hydraulic brake system. A fault of this type can occur for example as a result of leakages, as a result of a failure of a control valve or in particular also as a result of the failure of a hydraulic brake booster.

In this case, the first actuating device can be actuated relatively frequently (with a high frequency or momentum). In particular when the first actuating device is in the form of a brake pedal, it is known that the brake pedal, for example in the case of a dynamic traffic environment or also in the case of corresponding driving routes, is actuated with a relatively high frequency, sometimes more strongly and sometimes more weakly. In the event of a fault in the hydraulic break system, the electromechanical braking device is accordingly activated relatively frequently to exert an electromechanical braking force. The activation of the electromechanical braking device can generate an energy input, in particular in the form of thermal energy, in particular in an output stage, that is to say in a control device which activates the electromechanical braking device, but for example also in an actuator (in particular an electric motor) of the electromechanical braking device.

By means of the method according to the disclosure, this energy input can advantageously be reduced. If in particular the actuation of the first actuating device is thus started, then an electromechanical braking force is generated for a minimum generation period. If the actuation of the actuating device thus ends before the minimum generation period has elapsed, then an electromechanical braking force is still generated until the minimum generation period has elapsed. If the vehicle driver or the autonomous drive control actuates the first actuating device again in this period, then the electromechanical braking device does not have to be reactivated to generate an electromechanical braking force, and therefore the energy input in particular into a control device activating the electromechanical braking device and/or into an actuator of the electromechanical braking device can be reduced. Additionally or alternatively, it is conceivable for an electromechanical braking force to still be generated for a continued generation period after the end of the actuation of the first actuating device. If the first actuating device is thus actuated again in this period by the vehicle driver or the autonomous drive control, then likewise, the electrical braking device does not have to be reactivated to generate an electromechanical braking force, and therefore, in this case as well, the energy input in particular into a control device activating the electromechanical braking device and/or into an actuator of the electromechanical braking device can be reduced.

According to the disclosure, the frequency of the reactivation of the electromechanical braking device, in particular of an actuator of the electromechanical braking device, can thus be reduced. Overall, the energy input into the brake system, in particular into a control device activating the electromechanical braking device and/or into an actuator of the electromechanical braking device can thus be reduced.

In particular, a control device which activates the electromechanical braking device is subjected to an energy input, in particular in the form of thermal energy, each time the electromechanical braking device is activated. In particular output stages used for activation, such as MOSFETs of an H-bridge, can be subjected to a heat input in this case. To provide protection against an overload, in particular overheating, of the control device, it can be provided that, before there is a threat of an overload, the electromechanical braking device is no longer activated, and therefore no more electromechanical braking force is generated. In this case, in the event of a fault in the hydraulic braking device, no additional electromechanical braking force can be provided. According to the disclosure, in particular the risk of overheating of the control device activating the electromechanical braking device as a result of an overload due to repeated reactivation of the electromechanical braking device can be reduced, and therefore the risk of the electromechanical braking device being switched off and of the withdrawal of the electromechanical braking force thus generated as a result of (a threat of) overheating of the control device activating the electromechanical braking device can be reduced. This is a result of the fact that there is/are a minimum generation period and/or a continued generation period, and therefore the electromechanical braking device has to be reactivated less frequently, and thus the control device activating the electromechanical braking device can be protected against overheating.

The brake system thus behaves in a more simple and reproducible manner overall with respect to the vehicle driver. In particular an electromechanical braking force can be provided precisely when the vehicle driver requires it, no matter how often and at what intervals the vehicle driver actuates the first actuating device.

In this case, the first actuating device can be in particular a brake pedal. Accordingly, even in the event of a fault, the vehicle driver can brake with the brake pedal as usual, and an emergency deceleration or deceleration assistance is still carried out by activating the electromechanical braking device. Overall, the motor vehicle safety is thus increased, since the driver can routinely actuate the brake pedal. For the driver of a motor vehicle, a relatively simple and reproducible option for emergency deceleration is thus provided.

The electromechanical braking device can be in particular an automated handbrake (also referred to as an automatic handbrake or automated parking brake, APB for short). In this case, it is conceivable, in particular when a normal function of the first hydraulic braking device is provided, when the brake pedal is actuated, for a deceleration of the motor vehicle to be carried out by means of the hydraulic braking device. An electromechanical braking force is thus generated in the fault-free operating state in particular only when the motor vehicle is stationary. Only in the event of a fault, as a result of the fallback strategy proposed in the present case, an emergency deceleration takes place by exerting an electromechanically generated braking force.

It is understood that the disclosure can be used in brake systems of this type in which the hydraulic braking device and the electromechanical braking device are completely independent of one another in that they each comprise separate components. Conventionally, however, the implementation takes place in that for example electric motors of the electromechanical braking device and other additionally required components, such as a spindle-and-nut system, are integrated directly on a brake caliper of the hydraulic braking device (what is known as a motor-on-caliper system). This is implemented regularly on the wheels of the rear axle of a motor vehicle. This means that the first hydraulic braking device and the second electromechanical braking device use the same brake caliper and brake piston and the same brake disks. In this case, the brake piston can thus be displaced either hydraulically or electromechanically.

In one embodiment, the electromechanical braking force is generated for at least as long as the first actuating device is actuated. Therefore, after the end of the actuation of the first actuating device, it is possible to check whether the minimum generation period has already elapsed. If this is the case, then the electromechanically generated braking force can be withdrawn immediately. If this is not the case, then the electromechanically generated braking force can be continued until the minimum generation period has elapsed.

Additionally or alternatively, it is conceivable for the electromechanical braking force to still be generated for a continued generation period after the end of the actuation of the first actuating device. Overall, it can thus be ensured that sufficient emergency deceleration of a vehicle can be provided. In this case, in particular the risk of overheating of a control device activating the electromechanical braking device and/or of an actuator (for example an electric motor) of the electromechanical braking device or, based on this, a withdrawal of the generation of the electromechanical braking force as a result of an overload can be reduced.

In another embodiment, the minimum generation period and/or the continued generation period is/are selected in such a way that a control device activating the electromechanical braking device substantially does not warm up even when the first actuating device is repeatedly actuated, or warms up only up to a temperature below a limit temperature. In this case, the repeated actuation of the first actuating device means that the first actuating device is actuated again in extreme cases as soon as no more electromechanical braking force is generated, and therefore the control device reactivates the electromechanical braking device to generate an electromechanical braking force.

It has become apparent that in approx. 30% of all cases, the braking duration does not last one second. In another 20% of cases, the braking duration lasts between one and two seconds. According to the disclosure, by contrast, in the event of a fault, a delayed reduction of the electromechanical braking force takes place. This has a positive effect on the load of the control device activating the electromechanical braking device in particular when the driver actuates the first actuating device, in particular in the form of a brake pedal, relatively frequently, that is to say with a relatively high frequency.

Thus, it is firstly conceivable, even when the first actuating device is repeatedly actuated with a high frequency over a relatively long period, for no heating or substantially no heating of the control device to occur in the event of a fault. The control device is thus in thermal equilibrium, and therefore the heat generated in the control device can be dissipated to the surroundings. In this case, the surroundings can be for example the engine compartment. In this case, the control device can have a temperature of 140° C., while the engine compartment can have a temperature of 110° C. It would also be conceivable for the control device to heat up, but only up to a temperature below a limit temperature, so that no overload of the control device occurs.

In this context, it is conceivable for the minimum generation period to last between 1-6 s, in particular 4 s. Additionally or alternatively, the continued generation period can last between 1-6 s, in particular 4 s. If the control device thus reactivates the electromechanical braking device to generate a braking device every 1 to 6 seconds, in particular every 4 seconds, then still no overload of the control device occurs, and therefore the electromechanically generated braking force can be regenerated repeatedly. As a result, the vehicle safety can be increased.

It is further conceivable for the brake system to comprise a second actuating device which can be actuated manually by a user or automatically by an autonomous drive control, in particular a button, in the event of a fault in the hydraulic braking device, when the second actuating device is actuated by means of the electromechanical braking device, an electromechanical braking force being exerted to decelerate the motor vehicle. In this case, a vehicle driver can carry out an emergency deceleration despite the fault and in particular does not have to think about whether to actuate the first or the second actuating device. Instead, the vehicle driver can actuate for example only the first actuating device, and an electromechanical braking force is provided (where necessary, a (residual) hydraulic braking force can still be provided despite the fault). Alternatively, the vehicle driver can also actuate only the second actuating device, and an electromechanical braking force is provided. Of course, the vehicle driver can also actuate both actuating devices, and an electromechanical braking force is provided (where necessary, a (residual) hydraulic braking force can still be provided despite the fault).

In this context, it is conceivable, when only the second actuating device has been actuated, and the actuation of the second actuating device is then ended, for the generated electromechanical braking force to be immediately withdrawn. The second actuating device can be in particular a button. Said button is actuated in particular relatively infrequently. Thus, in this case, a simplified method sequence can be provided, in which a generated electromechanical braking force can be immediately withdrawn when the button is not actuated. An overload of the control device can still be prevented in that the button is actuated with a much lower frequency and thus much lower momentum than the first actuating device which is in particular in the form of a brake pedal.

Furthermore, it can be provided that, when both actuating devices are actuated, the electromechanical braking force is generated for a minimum generation period after the start of the actuation of the first actuating device, and/or that the electromechanical braking force is generated at least for an additional continued generation period after the end of the actuation of the first actuating device. Thus, when both actuating devices are actuated, the risk of an unwanted withdrawal of the electromechanically generated braking force as a result of (a threat of) overheating of the control device can also be reduced.

In this context, it is conceivable for the generated electromechanical braking force to be withdrawn only when both actuating devices are no longer actuated. Thus, in particular, sufficient emergency deceleration of the vehicle is ensured in the event of a fault in the hydraulic braking device.

We additionally propose that the first actuating device be in the form of a brake pedal, when only the first actuating device is actuated, the electromechanical braking force being exerted only when the magnitude of the pedal actuation (for example the pedal travel covered, or pedal force applied) has reached or exceeded a limit value. Of course, the minimum generation period starts in this case only when an electromechanical braking force is generated. In particular when there is only a partial failure of the hydraulic braking device, it can be undesirable for additional electromechanical deceleration to be provided when the brake pedal is actuated only lightly. It is thus conceivable to provide the additional electromechanical deceleration only in the case of a stronger brake pedal actuation in order to provide the additional deceleration to the vehicle when this is actually necessary as a result of the strong brake pedal actuation by the driver. In this context, the pedal actuation means in particular the displacement travel (pedal travel) of the brake pedal.

When the pedal actuation is at 100%, then the brake pedal is displaced into the maximum final brake position. In this case, it is conceivable for example for an electromechanical braking force to be generated only when the pedal actuation is between 40% and 60%, in particular at least 50% (brake pedal depressed halfway).

The pedal travel covered can be sensed in this case in particular by a pedal travel sensor. It would also be conceivable to extrapolate the pedal travel or the exerted pedal force by means of a pressure sensor in the brake circuit and thus generate an electromechanical braking force only after a limit pressure is reached or exceeded.

In this context, it is conceivable in particular for the electromechanically provided deceleration to be withdrawn only when the brake pedal is no longer actuated at all (and the minimum generation period and/or the continued generation period has/have elapsed). Alternatively, it is also conceivable for the electromechanically generated deceleration to be withdrawn at for example 10% to 30% pedal actuation (as soon as the minimum generation period and/or the continued generation period has/have elapsed). The electromechanically generated braking force can thus be provided in the event of a greater pedal actuation compared with the pedal actuation to withdraw the braking force. Thus, a property of hysteresis or inertia is advantageously impressed on the system.

In this case, it is conceivable for the electromechanical braking device for withdrawing the electromechanically generated braking force to be actuated in such a way that no more electromechanical braking force is generated. Alternatively, it is conceivable for the electromechanical braking device to be actuated into a starting position. The electromechanical braking device can comprise in particular an electromechanical brake motor as an actuator which drives a spindle mounted in an axial direction to displace a brake piston by means of a spindle nut so as to electromechanically exert a force on brake pads, which in turn act on a brake disk which is rigidly connected to a vehicle wheel. When activating the automated handbrake from an initial state, in this case firstly the free travel and the clearance must be overcome before a braking force can be built up electromechanically. Free travel refers to the distance which the spindle nut must overcome by means of the rotation of the spindle in order to come into contact with the brake piston. Clearance refers to the distance between the brake pads and the brake disk in vehicle disk brake systems. If no more electromechanical braking force is generated as a result, then the brake pads are no longer in contact with the brake disk, and therefore no more electromechanical braking force is generated. By contrast, in an initial state, the free travel or clearance is present again, and when the electromechanical braking device is actuated again, a certain period of time is required in order to overcome the clearance and free travel so as to then exert an electromechanical braking force.

A control device for a brake system of a motor vehicle which is designed and set up to carry out the method according to the disclosure is also according to the disclosure. The control device can accordingly comprise in particular a processor and a memory for carrying out the method according to the disclosure. The control device can additionally be designed in particular to activate the electromechanical braking device. In this case, in particular the minimum generation period and/or continued generation period can be selected in such a way that the control device does not or substantially does not warm up even when the first actuating device is repeatedly actuated, or warms up only to below a limit temperature.

Lastly, a brake system for a motor vehicle, comprising a hydraulic braking device, an electromechanical braking device, and a first actuating device, in particular a brake pedal, is also according to the disclosure. Furthermore, the brake system further comprises a control device according to the disclosure. In particular in the event of a fault in the hydraulic braking device, this brake system allows an increase in the vehicle safety, in that the vehicle driver can brake in particular in the usual manner by actuating the first actuating device, which is in particular in the form of a brake pedal.

Furthermore, the risk of (a threat of) overheating of the control device activating the electromechanical braking device or of the brake system per se as a result of an overload due to repeated reactivation of the electromechanical braking device can be reduced so that the risk of the electromechanical braking device being switched off and the withdrawal of the electromechanical braking force thus generated as a result of (a threat of) overheating of the brake system or of the braking device activating the electromechanical braking device can be reduced.

BRIEF DESCRIPTION OF THE DRAWINGS

Further features, possible applications and advantages of the disclosure can be found in the following description of exemplary embodiments of the disclosure, which are described with reference to the drawings,
in which.

Functionally equivalent elements and regions bear the same reference signs in the following drawings and are not described in detail again.

DETAILED DESCRIPTION

Figure 1:
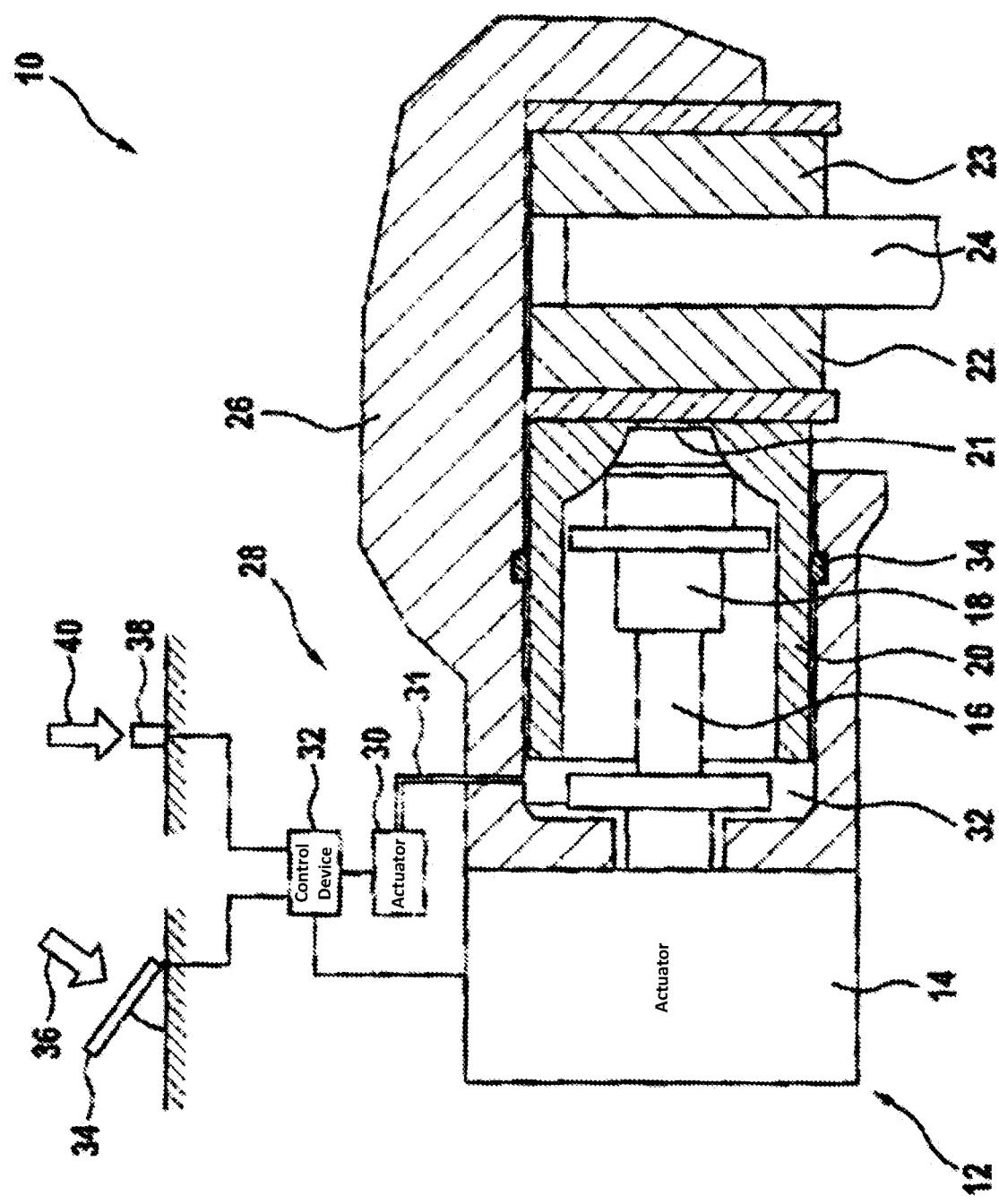
FIG. 1 is a schematic sectional view of a brake system of a vehicle, comprising a hydraulic and an electromechanical braking device in a "motor on caliper" design.

In FIG. 1, a brake system of a motor vehicle as a whole bears the reference sign 10. The motor vehicle itself is not shown in FIG. 1. However, in this case, the motor vehicle can be any type of motor vehicle, that is to say for example a passenger car, a motorcycle or a heavy goods vehicle. The brake system 10 can be provided in particular on the rear axle (additionally or alternatively also on the front axle) of the motor vehicle.

Firstly, the brake system 10 comprises an automated handbrake 12 in the form of an electromechanical braking device (also referred to as an automatic handbrake or automated parking brake, APB for short), which can exert an electromechanically generated clamping force (electromechanical braking force) by means of an actuator 14 (e.g. an electric brake motor or engine-transmission unit) to fix the vehicle in position.

For this purpose, the actuator 14 of the handbrake 12 drives a spindle 16, in particular a threaded spindle, which is mounted in an axial direction. On the end thereof facing away from the actuator 14, the spindle 16 is provided with a spindle nut 18 which, when the automated handbrake 12 is applied, is in contact with a brake piston 20. In this manner, the handbrake 12 electromechanically transmits a force to brake pads 22, 23 and thus to a brake disk 24, which is connected rigidly, or for conjoint rotation, to a vehicle wheel (not shown), in particular a wheel of a rear axle of the motor vehicle. In this case, the spindle nut 18 is in contact with an inner end face 21 of the brake piston 20 (also referred to as the rear side of the brake piston crown or inner piston crown). In the case of a rotational movement of the actuator 14 and a resulting rotational movement of the spindle 16, the spindle nut 18 is displaced in an axial direction. The spindle nut 18 and the brake piston 20 are mounted in a brake caliper 26 which overlaps the brake disk 24 in the manner of tongs. One of the brake pads 22, 23 is arranged on each of the two sides of the brake disk 24. In the case of a process of actuating the brake system 10 by means of the automated handbrake 12, the electric motor (actuator 14) rotates, whereupon the spindle nut 18 and the brake piston 20 are moved toward the brake disk 24 in the axial direction so as to thus generate a predetermined clamping force between the brake pads 22, 23 and the brake disk 24. As a result of the spindle drive and the self-locking effect which is linked thereto, a force generated by means of the handbrake 12 by activating the actuator 14 is still maintained even when the activation is ended.

The brake system according to FIG. 1 is in the form of what is known as a "motor-on-caliper" system. This means that the handbrake 12 is combined with a hydraulic braking device in the form of a service brake 28. The handbrake 12 could also be considered to be integrated in the system of the service brake 28. Both the automated handbrake 12 and the service brake 28 take hold of the same brake piston 20 in order to build up a braking force on the brake disk 24. However, the service brake 28 has a separate actuator 30. In FIG. 1, the service brake 28 is designed as a hydraulic system, the actuator 30 being able to be represented by an ESP pump or an electromechanical brake booster (for example the Bosch iBooster). Other embodiments of the actuator 30 are also conceivable, for example in the form of what is known as an IPB (integrated power brake) which represents in principle a brake-by-wire system in which a plunger is used to build up hydraulic pressure. In the case of normal service braking, a predetermined clamping force is built up hydraulically between the brake pads 22, 23 and the brake disk 24. To build up a braking force by means of the hydraulic service brake 28, a medium 31, in particular a substantially incompressible brake fluid, is pressed into a fluid chamber delimited by the brake piston 20 and the brake caliper 26. The brake piston 20 is sealed with respect to the surroundings by means of a piston seal ring 34.

When activating the automated handbrake 12, firstly the free travel and the clearance must be overcome before a braking force can be built up. Free travel refers to the distance which the spindle nut 18 must overcome by means of the rotation of the spindle 16 in order to come into contact with the brake piston 20. Clearance refers to the distance between the brake pads 22, 23 and the brake disk 24 in motor vehicle disk brake systems. At the end of a preparation phase of this type, the brake pads 22, 23 are applied to the brake disk 24, and the buildup of force starts in the event of additional or continued activation. FIG. 1 shows the state of the free travel and clearance already overcome. In this case, the brake pads 22, 23 are applied to the brake disk 24, and all the brakes, that is to say the handbrake 12 as well as the service brake 28, can build up a braking force immediately on the corresponding wheel in the case of subsequent activation. The descriptions of the clearance also apply analogously to the service brake 28, however, as a result of the high pressure build-up dynamics, overcoming a clearance requires less time than in the case of the handbrake.

The brake actuators 14 and 30 are activated by means of an output stage, that is to say by means of a control device 32, which can be for example a control device of a driving dynamics system, such as an ESP (electronic stability program) or another control device.

The brake system 10 also includes a first actuating device or a first actuating element, in the present case for example in the form of a brake pedal 34 which can be actuated according to the arrow 36 by a driver of the motor vehicle. Lastly, the brake system 10 includes a second actuating device or a second actuating element 38, for example in the form of a button which can be actuated by the driver in the direction of the arrow 40.

Overall, the brake system 10 operates as follows:

In a regular operating state of the operating system 10 having a properly functioning hydraulic vehicle brake 28, the vehicle is braked via the hydraulic vehicle brake 28 to implement a braking request by the driver when the driver of the vehicle actuates the brake pedal 34. The electromechanical braking device 12 is automatically activated when the vehicle is stationary. Furthermore, said device can be activated manually at the driver's request by said driver actuating the actuating element 38. While the vehicle is moving and the actuating element 38 is actuated in regular operation, a hydraulic braking force generated by means of the hydraulic braking device 18 is also applied to the brake disk 24.

Figure 2:
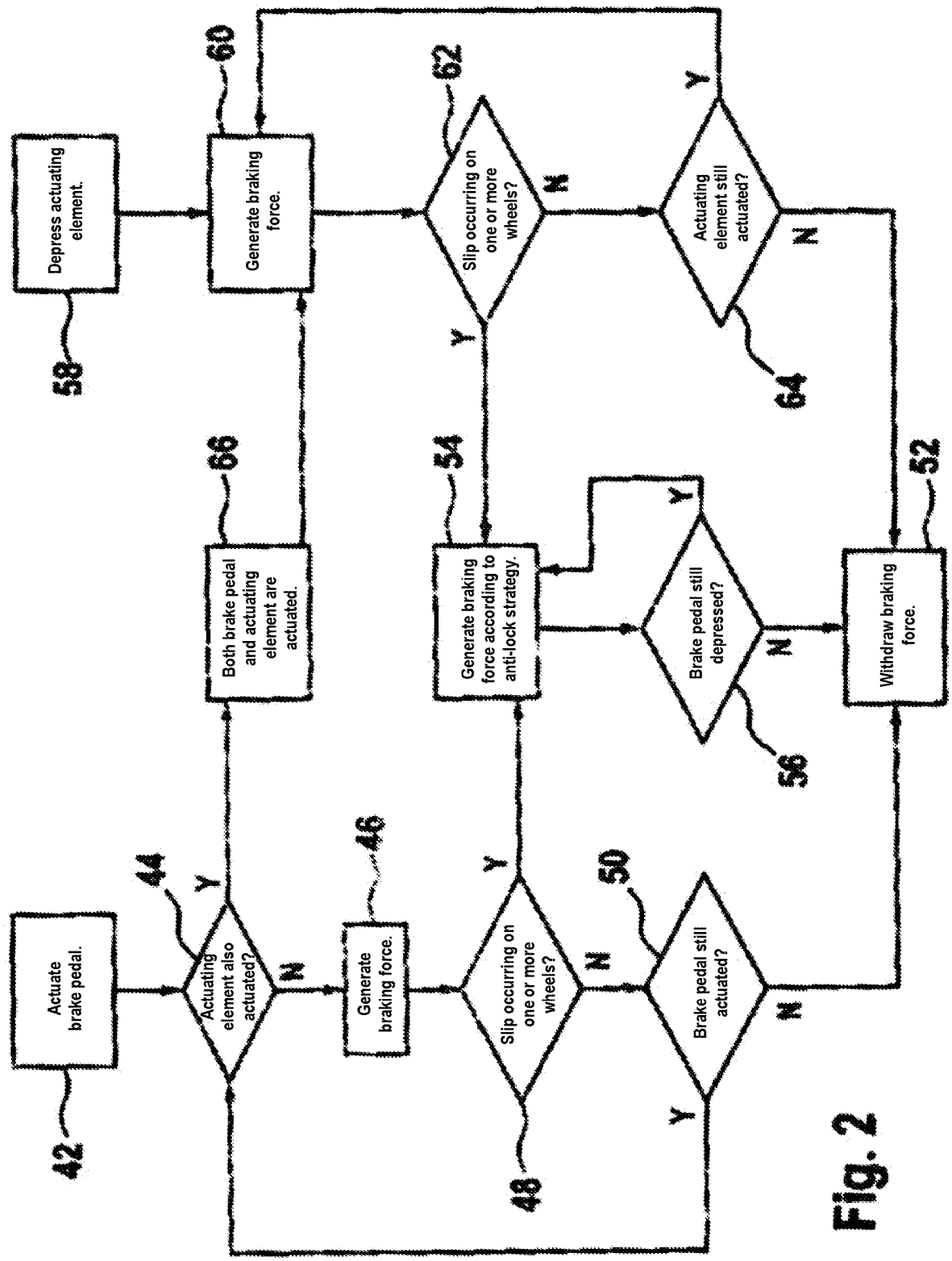
FIG. 2 is a flow chart comprising method steps for decelerating the vehicle in the event of a fault in the hydraulic braking device.

By contrast, in the event of a fault, the brake system 10 is operated in a type of fallback level according to the method steps shown in FIG. 2. A fault can be for example a failure or a partial failure of the brake boosting of the hydraulic vehicle brake 28. In this case, the control device 32 is designed and set up to carry out the method shown in FIG. 2.

In one step 42, the driver of the vehicle actuates the brake pedal 34 and thereby expresses a braking request. However, the control device 32 has determined that the hydraulic braking device 28 is operating in a faulty manner or is not operating at all.

Accordingly, in step 44, a check is firstly carried out as to whether the actuating element 38 is also actuated. If this is not the case, in step 46, the electromechanical braking device 12 is activated by the control device 32 to build up an electromechanical braking force. In this case, in particular a predetermined braking force can be generated. This can be in particular so high that the vehicle is decelerated with a deceleration of 1 m/s2. This target electromechanical braking force, which leads to a predefined vehicle deceleration, can be determined in advance for each vehicle and implemented accordingly. In the event of a partial failure of the hydraulic brake system 28, the deceleration thus provided can overlap with a deceleration as a result of a residual hydraulically generated braking force. It would thus be conceivable for example for a deceleration of 0.5 m/s2 to still be provided by the hydraulic braking device 28 even when the brake booster of the hydraulic braking device 28 fails. Accordingly, in addition to the hydraulic braking force from the electromechanical braking device 12, an additional electromechanically provided deceleration of for example 1 m/s2 can be generated.

In a next step 48, a check is then carried out as to whether slip is occurring on one or more wheels of the vehicle. Such a slip can take place for example as a result of leaves or snow or also as a result of an overlap of residual hydraulically generated braking force and additionally generated electromechanically generated braking force.

If no slip is occurring, then in step 50, a check is carried out as to whether the brake pedal 34 is still actuated. If the brake pedal 34 is still being actuated, then the method goes back to step 44.

If the brake pedal is no longer actuated, then the following procedure is carried out in step 52: A check is carried out as to whether an electromechanical braking force is still being generated even though the brake pedal 34 is no longer actuated. This check can take place in particular according to one of the embodiments shown in FIG. 3 to 5.

Figure 3:
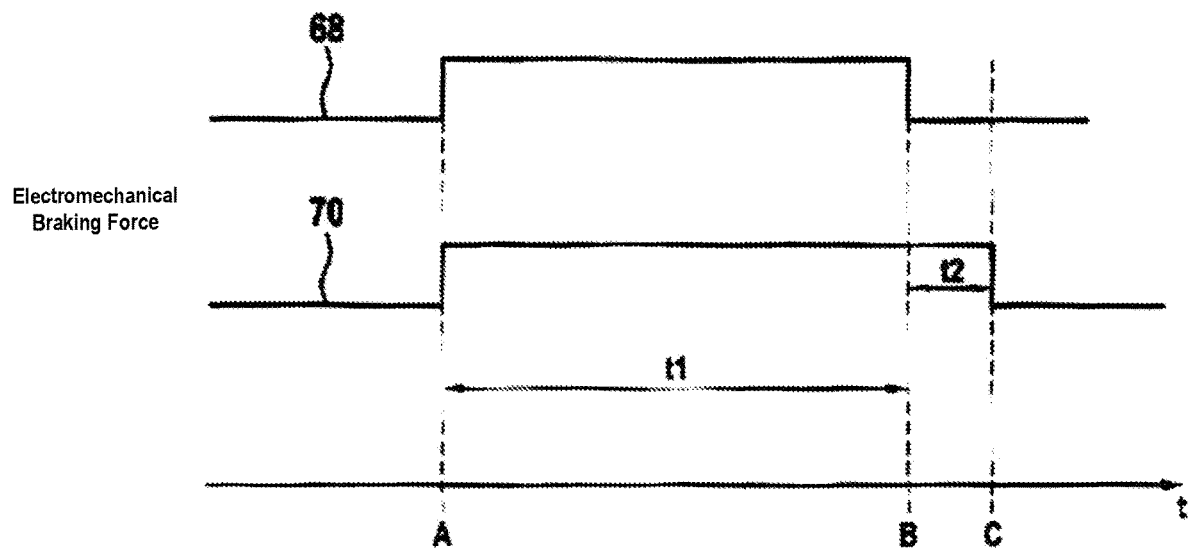
FIG. 3 shows a plot against time of an electromechanical braking force generated according to the method according to FIG. 2 according to one embodiment.

FIG. 3 shows, in the graph 68, the plot against time of the actuation of the brake pedal 34. In the subjacent graph 70, the plot against time of the generation of an electromechanical braking force by means of the electromechanical braking device 12 is shown. Before the point in time A, the brake pedal 34 is not actuated. Accordingly, no electromechanical braking force is generated either. At the point in time A, the brake pedal 34 is actuated (cf. step 42 in FIG. 2), the electromechanical braking device 12 is accordingly activated by the control device 32 in such a way that an electromechanical braking force is generated. At the point in time B, the brake pedal 34 is released again by the driver. The brake pedal has thus been actuated for a period t1. After the point in time B, however, an electromechanical braking force is generated for a continued generation period t2 (for example 4 s) until the point in time C. Thus, in step 50, according to this embodiment, a check is carried out as to whether the period t2 has already elapsed since the brake pedal was last actuated. Only after the continued generation period t2 has elapsed is step 52 carried out according to FIG. 2 so that the electromechanical braking force is withdrawn.

Figure 4:
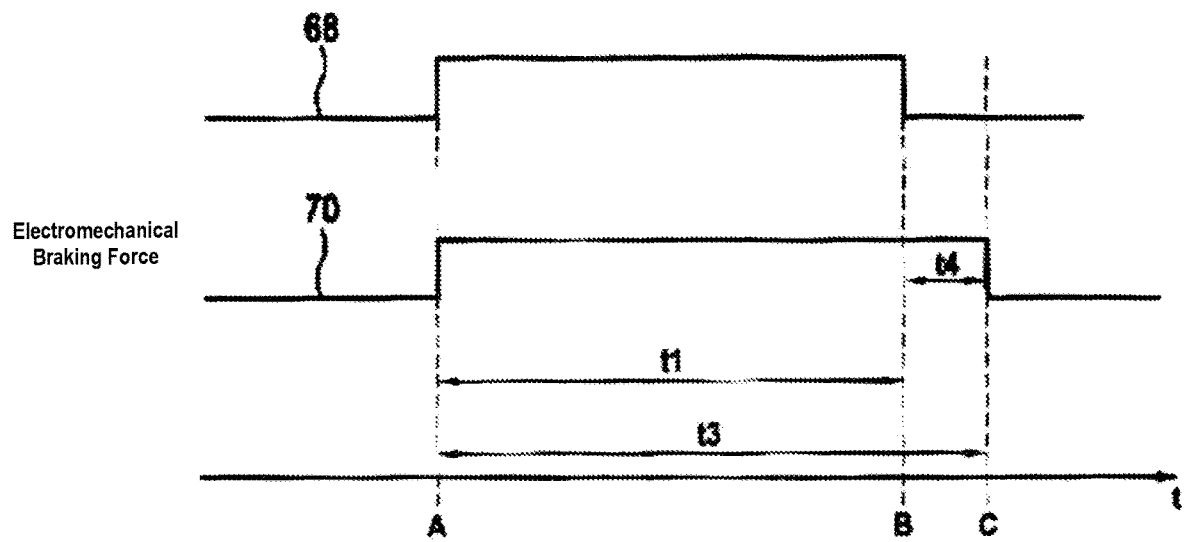
FIG. 4 shows a plot against time of an electromechanical braking force generated according to the method according to FIG. 2 according to another embodiment.

FIG. 4 shows another possible way to proceed in step 50. In this case, the brake pedal 34 is again actuated by the driver for the period t1, and in this period, an electromechanical braking force is also generated. At the point in time B, the driver releases the brake pedal 34. A check is then carried out as to whether the period t1 is shorter than a minimum generation period t3. If, as shown in FIG. 4, t1 is shorter than t3, then the electromechanically generated braking force is still generated for a period t4 until the minimum generation period t3 is reached. Only then is step 52 carried out, and the electromechanical braking force is withdrawn. If for example t3 lasts 4 seconds, and t1 lasts 2 seconds, then t4 lasts 2 seconds. If, however, according to this embodiment, it is determined in step 50 in the method according to FIG. 2 that t1 is equal to or longer than t3, then the electromechanical braking force is withdrawn immediately when the brake pedal 34 is released. The period t3 thus represents a minimum generation period for which an electromechanical braking force is generated at least, and specifically regardless of how long the brake pedal 34 is actually actuated.

Figure 5:
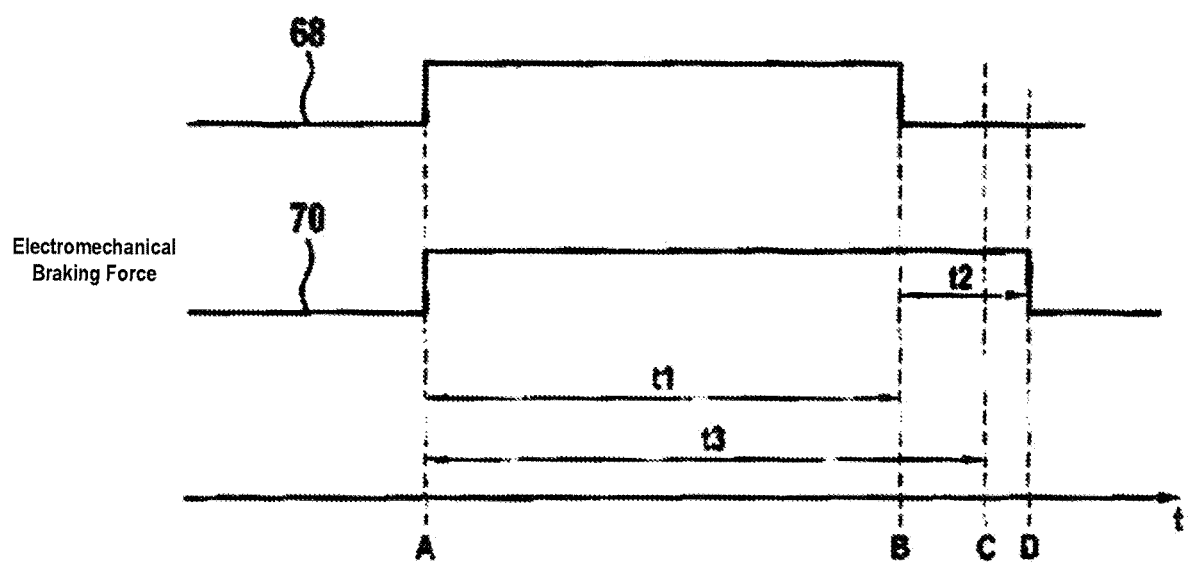
FIG. 5 shows a plot against time of an electromechanical braking force generated according to the method according to FIG. 2 according to yet another embodiment.

According to a third embodiment shown in FIG. 5, it would also be conceivable, in step 50 (cf. FIG. 2), after releasing the brake pedal, for a check to be carried out as to whether both the minimum generation period t3 and the continued generation period t2 have already elapsed. According to FIG. 5, the minimum generation period t3 elapses at the point in time C. The continued generation period t2 elapses at the later point in time D. An electromechanical braking force is thus still generated up to the point in time D.

If a slip is detected in FIG. 2 in step 48, then in step 54, an anti-locking strategy is followed. In this case, the electromechanical braking device 12 is alternately applied and released again. In particular, in this case, the applied electromechanically generated braking force can be increased in stages. This is therefore a rudimentary ABS function so that the vehicle having the electromechanically generated braking force can be decelerated dynamically. If the electromechanically generated braking force is completely withdrawn at a specific point in time by releasing the electromechanical braking device 12, then a maximum proportion of hydraulic braking force of the hydraulic braking device 28 operating in a faulty manner remains, and therefore excessive braking is reduced by this anti-locking strategy in step 54 in any case.

In this step 54, an electromechanically generated braking force can be generated, which leads to a(n additional) deceleration of 1 m/s2, as in step 46, or a higher braking force can be applied to generate a higher deceleration of for example 1.5 m/s2. If the anti-locking strategy is followed, then in step 56, a check is carried out as to whether the brake pedal is still depressed. If this is still the case, then the method goes back to step 54.

If this is not the case, then in step 56, again analogously to step 50, the procedures according to any of FIG. 3 to 5 are followed, and the electromechanical braking force is accordingly withdrawn in step 52 only after the minimum generation period t3 and/or the continued generation period t2 has/have elapsed.

If, by contrast, only the actuating element 38 is depressed in step 58, and the control device 32 has determined that the hydraulic braking device 28 is functioning in a faulty manner, then in step 60, an electromechanically generated braking force is generated to activate the electromechanical braking device 12. In this case, the electromechanical braking force can be so high that it leads to a vehicle deceleration of 1.5 m/s2. In this case, it is firstly conceivable, in the case of a still partially functioning hydraulic braking device 28, for a hydraulically generated braking force to still additionally be generated. However, in particular it is conceivable, in step 60, for only an electromechanically generated braking force to be generated by means of the electromechanical braking device 12. In step 62, in an analogous manner to step 48, a check is then carried out as to whether a slip of at least one vehicle tyre is occurring. If a slip is occurring, the method again switches to the anti-locking strategy according to steps 54 to 56.

If no slip is occurring, then in step 64, a check is again carried out as to whether the actuating element 38 is still actuated. If this is the case, then the method continues again with step 60. If this is not the case, then in step 52, the electromechanical braking device 12 is activated in such a way that the electromechanically generated braking force is withdrawn. If only the second actuating element 38 is actuated as a result, and the actuation is canceled, then the electromechanical braking force is thus completely withdrawn immediately. In this case as well, however, it would of course also be conceivable for the procedure to be carried out in step 64 according to any of the embodiments in FIG. 3 to 5.

If it is detected in step 44 that both the brake pedal 34 and the actuating element 38 are actuated, then in step 66, it is decided that step 60 is then carried out, and an electromechanically generated braking force is thus generated by means of the electromechanical braking device 12 at a level which is the same as in the case when only the actuating element 38 is actuated. If the actuating element 38 and the brake pedal 34 have been actuated initially, and one of the two actuating elements is then no longer actuated, then the steps 60 to 64 are still continued until it is determined in step 64 that none of the actuating elements 34, 38 is actuated anymore.

Analogously to the processes in steps 50 and 56, in step 64, the method then proceeds according to one of the embodiments set out in FIG. 3 to 5, and thus, after the minimum generation period t3 and/or the continued generation period t2 has/have elapsed, the generated electromechanical braking force is completely withdrawn in step 52. However, in this case a check is carried out as to whether, since the end of the actuation of the brake pedal 34, the minimum generation period t3 and/or the continued generation period t2 has/have already elapsed. If the periods have already elapsed, then the generated electromechanical braking force is immediately withdrawn as soon as none of the actuating elements 34 and 38 is actuated anymore.

If the two actuating elements 34 and 38 are actuated, and if a slip is determined in step 62, then the method is again switched to the anti-locking strategy according to steps 54 to 56. In this case, in step 56, a check is carried out as to whether at least one actuating element 34, 38 is still actuated. If none of the actuating elements 34, 38 is actuated anymore, then analogously to the processes in steps 50 and 64, the method proceeds in step 56 according to one of the embodiments set out in FIG. 3 to 5, and thus, after the minimum generation period t3 and/or the continued generation period t2 has/have elapsed, the generated electromechanical braking force is completely withdrawn in step 52. In this case a check is thus carried out as to whether, since the end of the actuation of the brake pedal 34, the minimum generation period t3 and/or the continued generation period t2 has/have already elapsed. If the periods have already elapsed, then the generated electromechanical braking force is immediately withdrawn as soon as none of the actuating elements 34 and 38 is actuated anymore.

It is conceivable for an electromechanically generated braking force to be generated according to FIG. 2 in step 46 only when the brake pedal 34 is depressed to a certain extent, that is to say when a certain limit value of the maximum pedal travel is exceeded. This can be for example 50% of the pedal travel. Furthermore, it is conceivable for the electromechanically generated braking force to be withdrawn in step 50 when the brake pedal is still displaced up to a certain limit value, and the minimum generation period t3 and/or the continued generation period t2 has/have already elapsed. This limit value can be for example 20% of the maximum displacement travel.

Regardless of whether only the brake pedal 34 or only the actuating element 38 or the two actuating elements 34, 38 are depressed, according to the method according to FIG. 2, when a slip is detected in steps 48 and 62, the method is switched to the anti-locking strategy according to step 54.

Overall, by means of the fallback strategy according to method steps 42 to 66 in FIG. 2, the vehicle safety can be increased. If in particular the hydraulic braking device 28 partially fails in any case, then the driver does not have to think about whether they have to press the brake pedal 34 or the actuating element 38 to be able to brake in an emergency. Regardless of which of the two actuating elements 34, 38 is pressed, an electromechanically generated braking force is provided to decelerate the vehicle.

Furthermore, in a particularly advantageous manner, an overload of the control device 32 and in particular also of the actuator 38 as a result of frequent pedal actuation of the brake pedal 34 taking place at a high frequency can be prevented in that a reactivation of the actuator 38 is carried out by the control device at a reduced frequency, in particular at the earliest after the minimum generation period t3 and/or the continued generation period t2 has/have elapsed. As a result, the energy input into the actuator 30 and/or the control device 32 can be reduced. In particular, overheating of the control device 32 and, resulting therefrom, a withdrawal of the electromechanically generated braking force as a result of a threat of overheating of the control device 32 can be effectively prevented. If the brake pedal 34 is actuated again in particular in the period t2 according to FIGS. 3 and 5 and in the period t4 according to FIG. 4, then the control device 32 does not have to activate the actuator 38 to generate an electromechanical braking force, since an electromechanical braking force is still being generated.

What is claimed is:

1. A method for operating a brake system of a motor vehicle, the brake system including a hydraulic braking device, an electromechanical braking device, and a first actuating device configured to operate the brake system, the method comprising:
   generating, while the first actuating device is actuated, a hydraulic braking force to decelerate the motor vehicle with the hydraulic braking device;
   determining that the hydraulic braking device has a fault; and
   generating, in response to determining the fault in the hydraulic braking device and while the first actuating device is actuated, an electromechanical braking force to decelerate the motor vehicle with the electromechanical braking device,
   wherein the electromechanical braking force is generated for at least one of (i) a minimum generation period after a start of the actuation of the first actuating device and (ii) an additional continued generation period after an end of the actuation of the first actuating device.

2. The method according to claim 1, the generating the electromechanical braking force further comprising:
   generating the electromechanical braking force at least for as long as the first actuating device is actuated.

3. The method according to claim 1, the generating the electromechanical braking force further comprising:
   activating the electromechanical braking device with a processor; and
   selecting the at least one of (i) the minimum generation period and (ii) the additional continued generation period such that the processor warms up only up to a first temperature below a limit temperature.

4. The method according to claim 1, wherein the at least one of (i) the minimum generation period and (ii) the additional continued generation period lasts between one to six seconds.

5. The method according to claim 4, wherein the at least one of (i) the minimum generation period and (ii) the additional continued generation period lasts four seconds.

6. The method according to claim 1, further comprising:
   generating the electromechanical braking force to decelerate the motor vehicle when the first actuating device and a second actuating device of the brake system are actuated.

7. The method according to claim 6, the generating the electromechanical braking force further comprising at least one of:
   generating the electromechanical braking force after the start of the actuation of the first actuating device for a minimum generation period when the first actuating device and the second actuating device are actuated; and
   generating the electromechanical braking force after the end of the actuation of the first actuating device at least for the additional continued generation period when the first actuating device and the second actuating device are actuated.

8. The method according to claim 6, wherein:
   the first actuating device is a brake pedal; and
   when only the first actuating device is actuated, the generating of the electromechanical braking force only occurs when the magnitude of the pedal actuation has reached or exceeded a limit value.

9. The method according to claim 6, wherein the second actuating device is a button.

10. The method according to claim 6, further comprising:
    withdrawing the generated electromechanical braking force when only the second actuating device has been actuated, and ending the actuation of the second actuating device.

11. The method according to claim 10, further comprising:
    withdrawing the electromechanically generated braking force by actuating the electromechanical braking device at least one of (i) in such a way that electromechanical braking force is no longer generated and (ii) in such a way that the electromechanical braking device is actuated into an initial position.

12. The method according to claim 1, wherein a processor for the brake system is configured to carry out the method.

13. A brake system for a motor vehicle, comprising:
    a hydraulic braking device;
    an electromechanical braking device;
    a first actuating device; and
    a processor configured to:
    generate, while the first actuating device is actuated, a hydraulic braking force to decelerate the motor vehicle with the hydraulic braking device;
    determine that the hydraulic braking device has a fault; and
    generate, in response to determining the fault in the hydraulic braking device and while the first actuating device is actuated, an electromechanical braking force to decelerate the motor vehicle with the electromechanical braking device,
    wherein the electromechanical braking force is generated for at least one of (i) a minimum generation period after a start of the actuation of the first actuating device and (ii) an additional continued generation period after an end of the actuation of the first actuating device.

14. The brake system according to claim 13, wherein the first actuating device is a brake pedal.

* * * * *